(12) United States Patent
Gorgenyi et al.

(10) Patent No.: US 8,049,918 B2
(45) Date of Patent: Nov. 1, 2011

(54) PRINT PLUG-IN ISOLATION

(75) Inventors: Frank Gorgenyi, Bremerton, WA (US); Oliver H. Foehr, Bellevue, WA (US); Adrian F. Maxa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 12/264,210

(22) Filed: Nov. 3, 2008

(65) Prior Publication Data
US 2010/0110476 A1 May 6, 2010

(51) Int. Cl.
G06F 3/12 (2006.01)
G06F 9/44 (2006.01)
G06F 15/16 (2006.01)

(52) U.S. Cl. ........................... 358/1.15; 719/321

(58) Field of Classification Search .................. 358/1.15; 719/321
See application file for complete search history.

(56) References Cited

U.S. PATENT DOCUMENTS

| | | | |
|---|---|---|---|
| 5,987,426 | A | 11/1999 | Goodwin, III |
| 6,098,133 | A | 8/2000 | Summers et al. |
| 6,654,903 | B1 | 11/2003 | Sullivan et al. |
| 7,069,553 | B2 | 6/2006 | Narayanaswamy et al. |
| 7,096,387 | B2 | 8/2006 | Durrant et al. |
| 2002/0113989 | A1 | 8/2002 | Ferlitsch et al. |
| 2002/0114004 | A1 | 8/2002 | Ferlitsch |
| 2002/0138558 | A1 | 9/2002 | Ferlitsch |
| 2004/0024835 | A1 | 2/2004 | Howard |
| 2004/0049741 | A1 | 3/2004 | Natori |
| 2006/0221382 | A1* | 10/2006 | Sedky et al. .................. 358/1.15 |
| 2006/0242270 | A1 | 10/2006 | Sankaranarayan et al. |
| 2007/0094673 | A1 | 4/2007 | Hunt et al. |

OTHER PUBLICATIONS

Herder, et al., "A Lightweight Method for Building Reliable Operating Systems Despite Unreliable Device Drivers", *Technical Report IR-CS-018*, Jan. 2006, 1-14.
Herder, et al., "Failure Resilience for Device Driversmag", *Computer Science Dept.*, Vrije Universiteit, Amsterdam, The Netherlands {inherder, herbertb, beng, philip, ast}@cs.vu.nl, (2007),41-50.
Wolf, Chris "From Verifying to Vandalizing", Redmondmag.com http://redmondmag.com/columns/print.asp?EditorialsID=1298, Is Driver Verifier preventing your system from booting? Here's how to shut it off.,(Apr. 2006),1-4.
"International Search Report", Mailed Date: Jun. 1, 2010, Application No. PCT/US2009/063032, Filed Date: Nov. 3, 2009, pp. 11. (MS# 325024.02).

* cited by examiner

Primary Examiner — Scott A Rogers

(57) ABSTRACT

Print plug-in isolation is described. In embodiment(s), a print system input can be received at a print system, and the print system input can be redirected from the print system to an isolation module that isolates one or more print plug-ins from the print system. The print system input can be processed at the isolation module with the one or more print plug-ins to generate print plug-in output, and the print plug-in output can then be communicated back to the print system from the isolation module.

20 Claims, 4 Drawing Sheets

PRINT PLUG-IN ISOLATION

BACKGROUND

A print server implemented to manage multiple printers, such as for a business or enterprise environment, can include third-party print plug-ins, such as print drivers, configuration modules, and print processors, that are provided by printer manufactures for the different types of printers. However, a large percentage of print system failures are caused by the print plug-ins, such as when print drivers are loaded in the same process space as the print spooler. The print plug-ins are loaded in the print spooler process space, and if one fails, will likely fail the print server so that all of the managed printers are unavailable or taken off-line. Failure of a print plug-in can cause immediate or subsequent process shutdown when illegal operations are performed or because of process corruption, such as accessing freed memory, overwriting valid memory utilized by another component, reading or writing protected memory, an access violation, a general protection fault, and the like.

SUMMARY

This summary is provided to introduce simplified concepts of print plug-in isolation. The simplified concepts are further described below in the Detailed Description. This summary is not intended to identify essential features of the claimed subject matter, nor is it intended for use in determining the scope of the claimed subject matter.

Print plug-in isolation is described. In embodiment(s), a print system input, such as a print job, configuration instruction, or other data processing instruction, can be received at a print system, and the print system input can be redirected from the print system to an isolation module that isolates one or more print plug-ins from the print system. The print system input can be processed at the isolation module with the one or more print plug-ins to generate print plug-in output, and the print plug-in output can then be communicated back to the print system from the isolation module.

In other embodiment(s) of print plug-in isolation, a print system input can be received as a print job, the print job can be stored, and the print plug-ins include a print driver that processes the print job to generate print data for a printer device. Alternatively, a print system input can be received as a configuration instruction, and the print plug-ins include a configuration module that processes the configuration instruction. In various embodiments, the print plug-ins can include any one or combination of a print driver, a configuration module, a rendering module, a print processor, a language monitor, or a port monitor of the print system.

BRIEF DESCRIPTION OF THE DRAWINGS

Embodiments of print plug-in isolation are described with reference to the following drawings. The same numbers are used throughout the drawings to reference like features and components.

DETAILED DESCRIPTION

Embodiments of print plug-in isolation provide that print plug-ins to a print system, such as print drivers, print processors, and configuration modules are isolated from the print spooler process of a print server. The print plug-ins are loaded in isolation modules in separate process space, and if a print plug-in fails, the print spooler process and the print server are not caused to also fail as a result of the faulty print plug-in. In addition, the print plug-ins can be isolated from each other to increase the reliability of the print server.

Embodiments of print plug-in isolation apply not only to printing specifically, but are also applicable to processing, transforming, and/or generating documents, and are applicable when isolating plug-ins in an isolation mode to preclude various print plug-in failures. Failure of a print plug-in can cause immediate or subsequent process shutdown when illegal operations are performed or because of process corruption, such as accessing freed memory, overwriting valid memory utilized by another component, reading or writing protected memory, an access violation, a general protection fault, and the like.

While features and concepts of the described systems and methods for print plug-in isolation can be implemented in any number of different environments, systems, and/or various configurations, embodiments of print plug-in isolation are described in the context of the following example systems and environments.

Figure 1:
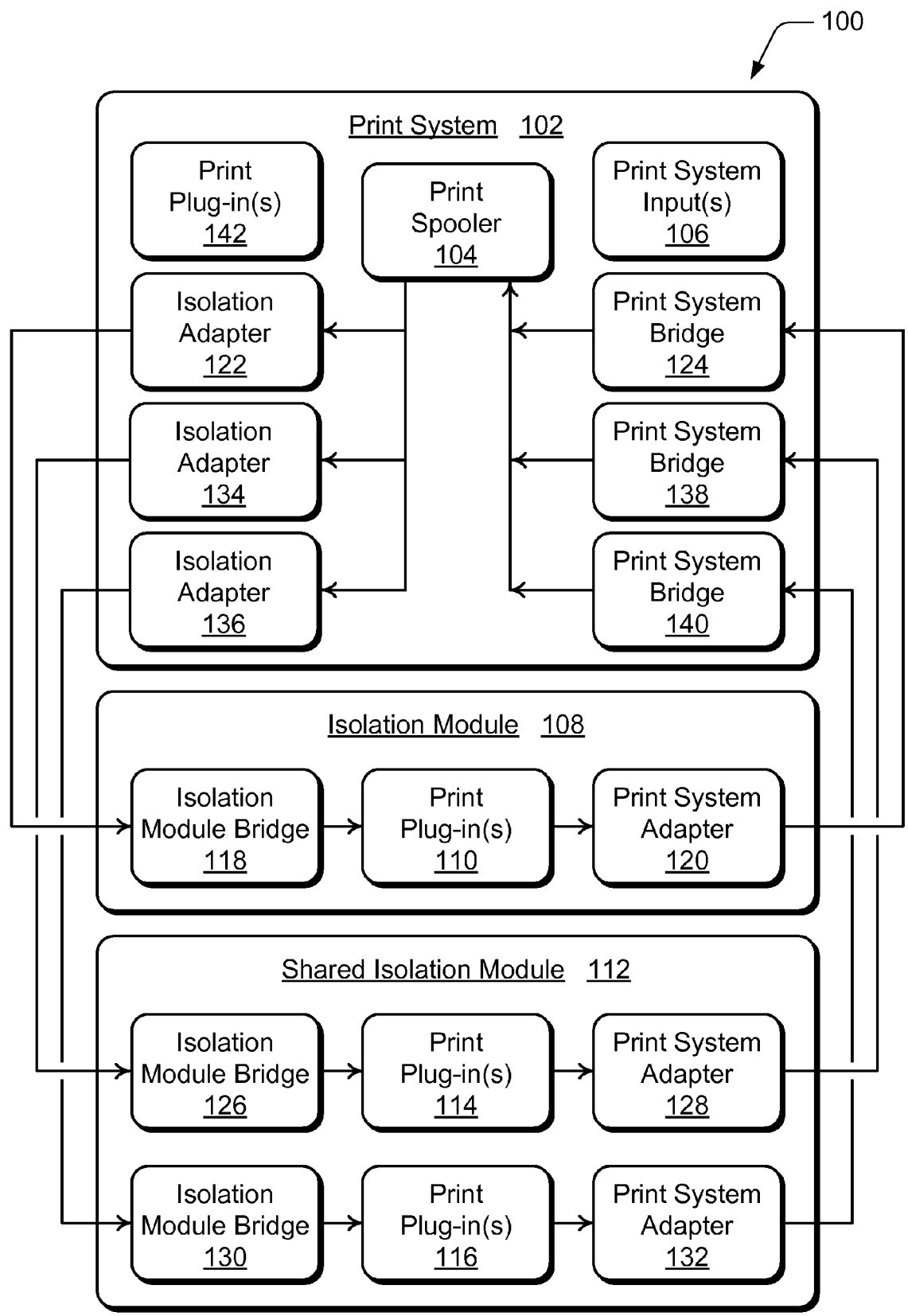
FIG. 1 illustrates an example print server in which embodiments of print plug-in isolation can be implemented.

FIG. 1 illustrates an example print server 100 in which various embodiments of print plug-in isolation can be implemented. Print server 100 manages a print system 102 and can be implemented as a software application (e.g., computer-executable instructions), in a computer device, workstation, and/or in a network server device that can be implemented to manage multiple printers, such as for a business or enterprise environment. Print system 102 can be utilized for standalone, workgroup, and/or network printing. Print system 102 includes a print spooler 104 that can be implemented as a software application to manage and/or buffer print jobs received as print system input(s) 106 at print system 102. The print system input(s) 106 can include any type of print job, configuration instruction, or other data processing instruction that may include processing, transforming, and/or generating documents.

A print server can include various print plug-ins that are often provided by third-party, printer manufacturers. The various print plug-ins can include print drivers, print processors, configuration modules, language monitors, port monitors, and/or any other various types of device drivers and rendering components. A print driver is implemented to process and convert a print job to print data that is in a form specific for a particular printer device. Similarly, a print processor manages a conversion process for a rendering module that processes print data for a print job, such as PDL (page description language) data. A configuration module can be implemented to report device capabilities, configure device settings, modify a state of a printer device, and/or receive and process a configuration instruction received as a print system input 106. A language monitor can be implemented to filter and/or add to the PDL data that is communicated to a printer device, and to perform bookkeeping tasks, such as page counting and the like. A port monitor can be implemented for data communication between other devices in a printing environment.

In this example, print server 100 includes an isolation module 108 implemented to isolate print plug-ins 110, and also includes a shared isolation module 112 implemented to isolate print plug-ins 114 and 116. The various print plug-ins are isolated from print system 102 and the print spooler 104, and are executable in separate processes so that if a print driver fails, for example, it will likely not crash the print spooler or otherwise take the print system off-line. Isolating the print spooler 104 from the print drivers (e.g., print plug-ins), and isolating the print drivers from each other, can increase reliability of the print system 102. In various embodiments, the print system 102 can be implemented to activate, deactivate, instantiate, and/or manage and initiate instantiation of the isolation modules to isolate the print plug-ins from the print system, as well as to isolate one or more of the print plug-ins from each other.

Isolation module 108 includes print plug-ins 110 (e.g., print drivers, print processors, configuration modules, language monitors, and/or port monitors) for one particular printer device. The isolation module 108 also includes an isolation module bridge 118 and a print system adapter 120. Print system 102 includes an isolation adapter 122 that corresponds to the isolation module bridge 118 via which the print system 102 and the isolation module 108 communicate print system inputs 106. Print system data for a printer device that is associated with print plug-ins 110 can then be communicated from isolation adapter 122, to isolation module bridge 118, to print plug-ins 110, to print system adapter 120, and to print system bridge 124.

The isolation adapter 122 is an in-process interface by which data is bridged from the print system 102 to the isolation module 108. In an embodiment, the print plug-in communications described herein, such as from isolation adapter 122 at print system 102 to the isolation module bridge 118 at isolation module 108 can be implemented as COM (component object model) via LRPC (lightweight remote procedure call). Alternatively, any other remote procedure call protocol can be utilized. In this example, procedure calls are proxied via COM across process boundaries and to specific instances in a process. Print system 102 also includes a print system bridge 124 that corresponds to the print system adapter 120 via which the isolation module 108 communicates a print plug-in output back to the print system 102.

Shared isolation module 112 includes print plug-ins 114 and 116 (e.g., print drivers, print processors, configuration modules, language monitors, and/or port monitors) that are associated with different, respective printer devices. The various print plug-ins 114 and 116 are grouped together, or otherwise implemented together, in the shared isolation module 112 as print plug-ins that are related, likely to have a high degree of reliability, and/or unlikely to fail causing all of the print plug-ins in the shared isolation module to also fail.

Print system 102 includes multiple isolation adapters, one each that corresponds to an isolation module bridge in an isolation module. Similarly, print system 102 includes multiple print system bridges, one each that corresponds to a print system adapter in an isolation module. The shared isolation module 112 includes an isolation module bridge 126 and a print system adapter 128 that are associated with print plug-ins 114. Similarly, the shared isolation module 112 includes an isolation module bridge 130 and a print system adapter 132 that are associated with print plug-ins 116. Print system 102 includes an isolation adapter 134 that corresponds to the isolation module bridge 126 via which the print system 102 and the shared isolation module 112 communicate print system inputs 106. Similarly, print system 102 includes an isolation adapter 136 that corresponds to the isolation module bridge 130. Print system 102 also includes a print system bridge 138 that corresponds to print system adapter 128, and includes a print system bridge 140 that corresponds to print system adapter 132.

Print system data for a printer device that is associated with print plug-ins 114 can then be communicated from isolation adapter 134, to isolation module bridge 126, to print plug-ins 114, to print system adapter 128, and to print system bridge 138. Similarly, print system data for a different printer device that is associated with print plug-ins 116 can then be communicated from isolation adapter 136, to isolation module bridge 130, to print plug-ins 116, to print system adapter 132, and to print system bridge 140. In an embodiment, print system 102 can also include one or more print plug-ins 142 that are not installed in an isolation module, or in a shared isolation module.

When the print server 100 receives a print plug-in to load and/or install, the print system 102 can determine an isolation mode from the print plug-in itself if the print plug-in includes configuration information. The print system 102 can then provision or install, or initiate installation, of the print plug-in in an isolated mode (e.g., provisioned in an isolation module similar to isolation module 108), provision the print plug-in in a shared mode (e.g., provisioned in a shared isolation module, such as shared isolation module 112), or provision the print plug-in within the print system 102 (e.g., not in an isolated mode and the print plug-in runs in the same process as the print spooler 104). In an embodiment, a print plug-in can be optionally configured for a particular isolation mode by an administrator.

Figure 2:
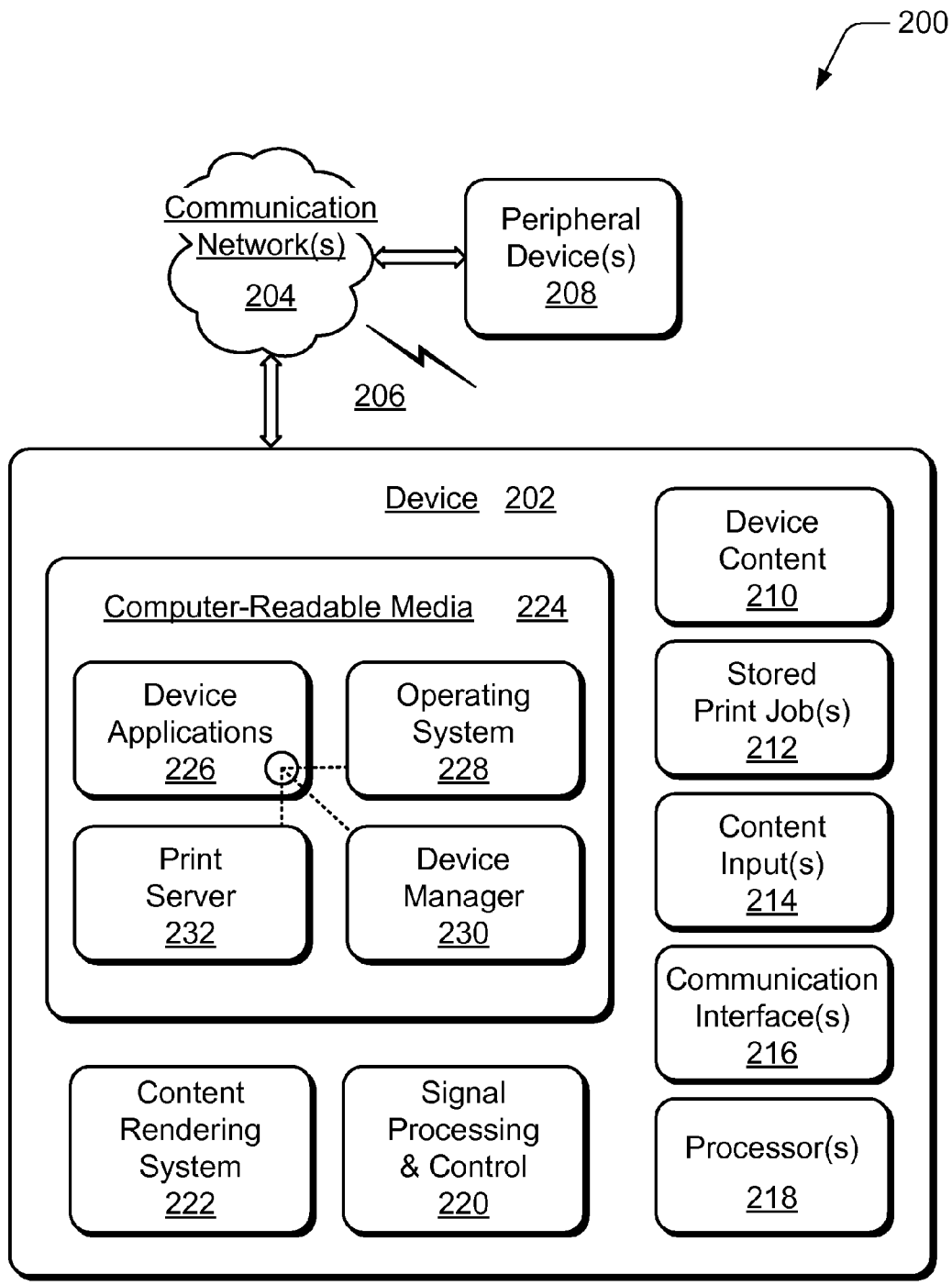
FIG. 2 illustrates various components of an example device that can implement embodiments of print plug-in isolation.

FIG. 2 illustrates an example system 200 in which various embodiments of print plug-in isolation can be implemented. Example system 200 includes a device 202 (e.g., a wired and/or wireless device) that can be implemented as any type of computer, portable computer, workstation, or network server device that can receive, display, and/or communicate data in any form of audio, video, and/or image data. Device 202 can be implemented with any number and combination of differing components, and may also be associated with a user (i.e., a person) and/or an entity that operates the device such that a device describes logical devices that include users, software, and/or a combination of devices.

Device 202 can be implemented for data communication via communication network(s) 204 that can include any type of a data network, voice network, broadcast network, an IP-based network, and/or a wireless network 206 that facilitates data, messaging, and/or voice communications. Device 202 can be communicatively linked to any number of peripheral devices 208, such as a standalone printer connected to a computer, workstation, or workgroup, and/or multiple printers in a business environment connected to a network server device.

Device 202 can include device content 210, such as configuration settings of the device, media content stored on the device, information associated with a user of the device, authentication data, and/or a print system event log that can include identifiers of print plug-ins, isolation module identifiers, and correlations between the various modules. Media content stored on device 202 can include any type of data as well as audio, video, and/or image media content received from any media content source. Device 202 can also include stored print job(s) 212, such as when device 202 receives a print job and maintains the print data as a stored print job before processing the print job. In an event that a print job fails to process or print, the print job can be retrieved subsequent the failure and can then be processed again.

Device 202 can include one or more content inputs 214 via which data and/or content can be received. Device 202 further includes one or more communication interfaces 216 that can be implemented as any one or more of a serial and/or parallel interface, a wireless interface, any type of network interface, a modem, and as any other type of communication interface. The communication interfaces 216 provide a connection and/or communication links between device 202 and communication network(s) 204 by which other electronic, computing, communication, and/or peripheral devices 208 can communicate data with device 202.

Device 202 can include one or more processors 218 (e.g., any of microprocessors, controllers, and the like) which process various computer-executable instructions to control the operation of device 202 and to implement embodiments of print plug-in isolation. Alternatively or in addition, device 202 can be implemented with any one or combination of hardware, firmware, or fixed logic circuitry that is implemented in connection with signal processing and control circuits which are generally identified at 220. Device 202 can also include a content rendering system 222 to render and/or generate data for display.

Device 202 can also include computer-readable media 224, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 224 provides data storage mechanisms to store the device content 210 and the stored print jobs 212, as well as various device applications 226 and any other types of information and/or data related to operational aspects of device 202. The device applications 226 can include an operating system 228, a device manager 230, and a print server 232. The device applications 226 can each be maintained as a computer application with the computer-readable media 224 and executed on the processors 218. In this example, the device applications 226 are shown as software modules and/or computer applications that can implement various embodiments of print plug-in isolation. The device manager 230 can be implemented as any type of control application, software application, signal processing and control module, code that is native to the device, and/or a hardware abstraction layer for the device. The print server 232 is an example of print server 100 described with reference to FIG. 1.

Although not shown, device 202 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Example methods 300 and 400 are described with reference to respective FIGS. 3 and 4 in accordance with one or more embodiments of print plug-in isolation. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example method(s) may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
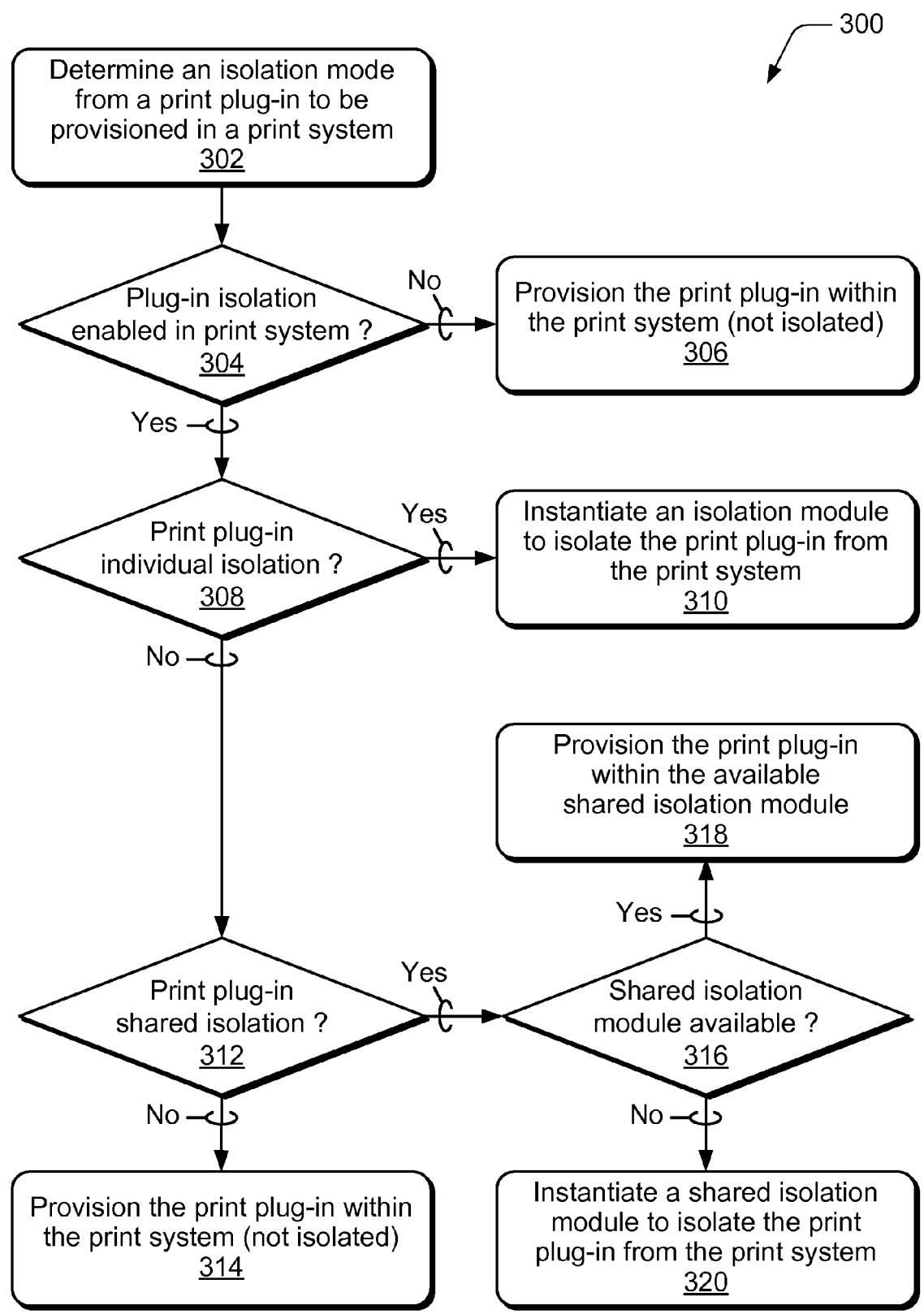
FIG. 3 illustrates example method(s) for print plug-in isolation in accordance with one or more embodiments.

FIG. 3 illustrates example method(s) 300 of print plug-in isolation. The order in which the method is described is not intended to be construed as a limitation, and any number of the described method blocks can be combined in any order to implement the method, or an alternate method.

At block 302, an isolation mode is determined from a print plug-in that is to be provisioned in a print system. For example, print server 100 (FIG. 1) receives a print plug-in to provision (e.g., load, install) and the print system 102 determines an isolation mode from the print plug-in itself if the print plug-in includes configuration information. The isolation mode can be determined as an isolated mode, a shared mode, or not isolated.

At block 304, a determination is made as to whether the print system is enabled for print plug-in isolation. If the print system is not enabled for print plug-in isolation (i.e., "no" from block 304), then at block 306, the print plug-in is provisioned within the print system (e.g., and not isolated). For example, print system 102 includes print plug-ins 142 that are not installed or provisioned in an isolation mode, but rather in the same process as the print spooler 104. If the print system is enabled for print plug-in isolation (i.e., "yes" from block 304), then at block 308, a determination is made as to whether the print plug-in is configured for individual isolation.

If the print plug-in is configured for individual isolation (i.e., "yes" from block 308), then at block 310, an isolation module is instantiated to isolate the print plug-in from the print system. For example, print system 102 instantiates isolation module 108 and provisions print plug-ins 110 in the isolation module. In an embodiment, an administrator can configure the print plug-in for individual isolation in an isolation module. If the print plug-in is not configured for individual isolation (i.e., "no" from block 308), then at block 312, a determination is made as to whether the print plug-in is configured for shared isolation.

If the print plug-in is not configured for shared isolation (i.e., "no" from block 312), then at block 314, the print plug-in is provisioned within the print system (e.g., and not isolated). For example, print system 102 includes print plug-ins 142 that are not provisioned or installed in an isolation mode, but rather in the same process as the print spooler 104. If the print plug-in is configured for shared isolation (i.e., "yes" from block 312), then at block 316, a determination is made as to whether a shared isolation module is available in which to include the print plug-in.

If a shared isolation module is available (i.e., "yes" from block 316), then at block 318, the print plug-in is provisioned in the available shared isolation module. For example, print system 102 provisions print plug-ins 114 in the shared isolation module 112 if the shared isolation module is available and/or has already been instantiated. If a shared isolation module is not available (i.e., "no" from block 316), then at block 320, a shared isolation module is instantiated to isolate the print plug-in from the print system. For example, print system 102 instantiates shared isolation module 112 and provisions print plug-ins 114 in the shared isolation module.

Figure 4:
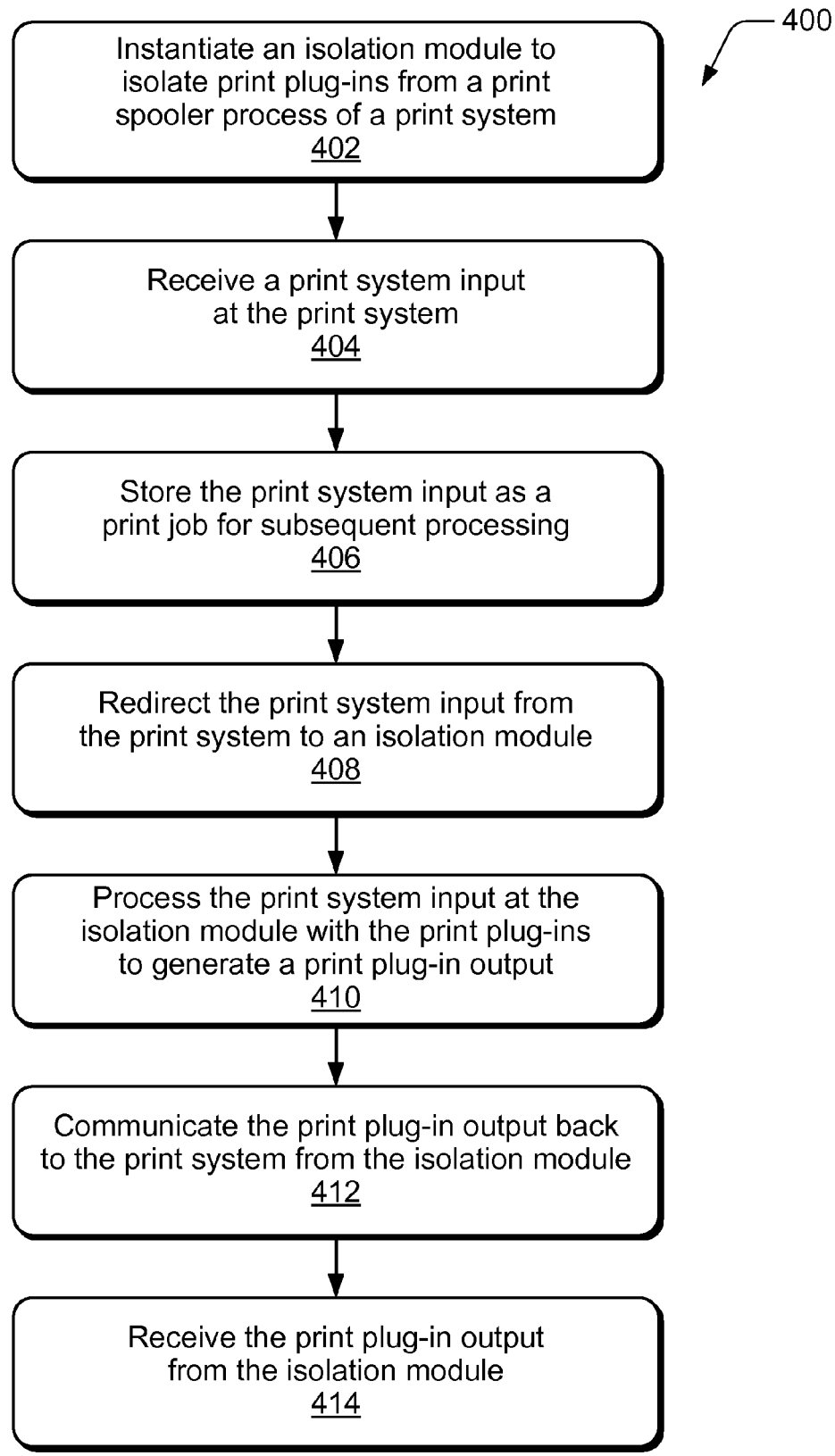
FIG. 4 illustrates example method(s) for print plug-in isolation in accordance with one or more embodiments.

FIG. 4 illustrates example method(s) 400 of print plug-in isolation. The order in which the method is described is not intended to be construed as a limitation, and any number of the described method blocks can be combined in any order to implement the method, or an alternate method.

At block 402, an isolation module is instantiated that isolates print plug-ins from a print spooler process of a print system. For example, print system 102 (FIG. 1) instantiates isolation module 108 to isolate print plug-ins 110 that correspond to a printer device from the print spooler 104 of the print system 102. In various embodiments, the print plug-ins 110 can include a print driver, a configuration module, a rendering module, a print processor, a language monitor, and/or a port monitor. The print system 102 can also instantiate the shared isolation module 112 that isolates print plug-ins 114 and 116 from the print spooler 104 of the print system 102, where the print plug-ins 114 and 116 correspond to multiple printer devices and are grouped together in the shared isolation module 112 based on a high degree of reliability.

At block 404, a print system input is received at the print system. For example, print system 102 receives a print system input 106 as a print job and/or as a configuration instruction. At block 406, the print job is stored, or otherwise maintained, for subsequent (e.g., future) processing. For example, the print system 102 stores a print job 212 that is received as a print system input 106. The print system 102 maintains the print data, and in an event that the print job fails to process or print, the print job can be retrieved subsequent the failure and can then be processed again.

At block 408, the print system input is redirected from the print system to an isolation module that isolates one or more print plug-ins from the print system. For example, print system 102 includes isolation adapter 122 via which a print system input 106 is redirected to the isolation module bridge 118 at isolation module 108. At block 410, the print system input is processed at the isolation module with the one or more print plug-ins to generate print plug-in output. For example, the print system input 106 is processed by the print plug-ins 110 at isolation module 108 to generate a print plug-in output.

At block 412, the print plug-in output is communicated back to the print system from the isolation module and, at block 414, the print plug-in output is received from the isolation module. For example, the isolation module 108 includes print system adapter 120 via which a print plug-in output is communicated from the isolation module 108 to the print system bridge 124 where the print system 102 receives the print plug-in output.

Although embodiments of print plug-in isolation have been described in language specific to features and/or methods, it is to be understood that the subject of the appended claims is not necessarily limited to the specific features or methods described. Rather, the specific features and methods are disclosed as example implementations of print plug-in isolation.

The invention claimed is:

1. A method, comprising:
   receiving a print system input at a print system;
   redirecting the print system input from the print system to an isolation module that isolates one or more print plug-ins from the print system;
   processing the print system input at the isolation module with the one or more print plug-ins to generate print plug-in output; and
   communicating the print plug-in output back to the print system from the isolation module.

2. A method as recited in claim 1, wherein the print system input is received as a print job, and wherein the one or more print plug-ins include a print driver that processes the print job to generate print data for a printer device.

3. A method as recited in claim 1, wherein the print system input is received as a configuration instruction, and wherein the one or more print plug-ins include a configuration module that processes the configuration instruction.

4. A method as recited in claim 1, wherein the one or more print plug-ins include at least one of a print driver, a configuration module, a rendering module, a print processor, a language monitor, or a port monitor.

5. A method as recited in claim 1, further comprising receiving the print system input as a print job, and storing the print job for subsequent processing before redirecting the print job to the isolation module.

6. A method as recited in claim 1, further comprising instantiating the isolation module that isolates the one or more print plug-ins from the print system, the one or more print plug-ins corresponding to a printer device.

7. A method as recited in claim 1, further comprising instantiating the isolation module as a shared isolation module that isolates the one or more print plug-ins from the print system, the one or more print plug-ins corresponding to multiple printer devices and grouped together in the shared isolation module based on a high degree of reliability.

8. A print server, comprising:
   a print system configured to receive a print system input and redirect the print system input to one or more print plug-ins that are configured to process the print system input to generate a print plug-in output; and
   an isolation module configured to isolate the one or more print plug-ins from a print spooler process of the print system and communicate the print plug-in output from the one or more print plug-ins back to the print system when the print plug-in output is generated.

9. A print server as recited in claim 8, wherein the one or more print plug-ins include a print driver, and wherein the print system is further configured to receive the print system input as a print job and redirect the print job to the isolation module where the print driver is configured to process the print job to generate print data for a printer device.

10. A print server as recited in claim 8, wherein the one or more print plug-ins include a configuration module, and wherein the print system is further configured to receive the print system input as a configuration instruction and redirect the configuration instruction to the isolation module where the configuration module is configured to process the configuration instruction.

11. A print server as recited in claim 8, wherein the one or more print plug-ins include at least one of a print driver, a configuration module, a rendering module, a print processor, a language monitor, or a port monitor.

12. A print server as recited in claim 8, wherein the print system is further configured to receive the print system input as a print job, and initiate the print job being stored for subsequent retrieval before the print job is redirected to the isolation module.

13. A print server as recited in claim 8, wherein the print system is further configured to instantiate the isolation module that isolates the one or more print plug-ins from the print spooler process of the print system.

14. A print server as recited in claim 8, wherein the print system is further configured to instantiate the isolation module as a shared isolation module that isolates the one or more print plug-ins from the print spooler process of the print system, the one or more print plug-ins corresponding to multiple printer devices and grouped together in the shared isolation module based on a high degree of reliability.

15. A method, comprising:
- determining an isolation mode from a print plug-in to be provisioned in a print system;
- instantiating an isolation module to isolate the print plug-in from a print spooler process of the print system;
- provisioning the print plug-in in the isolation module;
- receiving a print system input;
- redirecting the print system input to the print plug-in in the isolation module to process the print system input to generate a print plug-in output; and
- receiving the print plug-in output from the isolation module.

16. A method as recited in claim 15, further comprising receiving the print system input as a print job, and storing the print job for subsequent processing before redirecting the print job to the print plug-in in the isolation module.

17. A method as recited in claim 15, further comprising instantiating the isolation module as a shared isolation module, and provisioning the print plug-in in the shared isolation module along with additional print plug-ins that are grouped together in the shared isolation module based on a high degree of reliability.

18. A method as recited in claim 15, further comprising determining the isolation mode as at least one of an isolated mode, a shared mode, or not isolated.

19. A method as recited in claim 15, wherein the print system input is received as a print job, and wherein the print plug-in is a print driver that processes the print job to generate print data for a printer device.

20. A method as recited in claim 15, wherein the print system input is received as a configuration instruction, and wherein the print plug-in is a configuration module that processes the configuration instruction.

* * * * *